(No Model.)

H. B. DODGE.
WINDOW SCREEN.

No. 480,562. Patented Aug. 9, 1892.

WITNESSES:
F. McArdle.
C. Sedgwick

INVENTOR:
H. B. Dodge
BY Munn & Co.
ATTORNEYS

THE NORRIS PETERS CO., PHOTO-LITHO., WASHINGTON, D. C.

UNITED STATES PATENT OFFICE.

HENRY B. DODGE, OF CHICAGO, ILLINOIS, ASSIGNOR TO THE MONROE MANUFACTURING AND LUMBER COMPANY, OF LIMA, OHIO.

WINDOW-SCREEN.

SPECIFICATION forming part of Letters Patent No. 480,562, dated August 9, 1892.

Application filed October 19, 1891. Serial No. 409,162. (No model.)

*To all whom it may concern:*

Be it known that I, HENRY B. DODGE, of Chicago, in the county of Cook and State of Illinois, have invented a new and useful Improvement in Window-Screens, of which the following is a full, clear, and exact description.

This invention relates to screens for windows for ventilating purposes and for the exclusion of insects and in which the screen is fitted to slide in grooves in the sides of the window-frame to adjust it for use at top or bottom of the window and is controlled by an attached laterally-bearing spring for operation within the grooved portion of the window-frame in which the screen slides to provide for the ready insertion and removal of the screen, as required, and to hold it in place when inserted.

The invention comprises a sliding screen of rabbeted construction for operation within the grooved ways of the window-frame and provided with a special laterally-bearing spring or insect-excluding guard, substantially as hereinafter described, and more particularly pointed out in the claim, whereby a more perfect tight-fitting screen is obtained.

Reference is to be had to the accompanying drawings, forming a part of this specification, in which similar letters of reference indicate corresponding parts in all the views.

Figure 1:
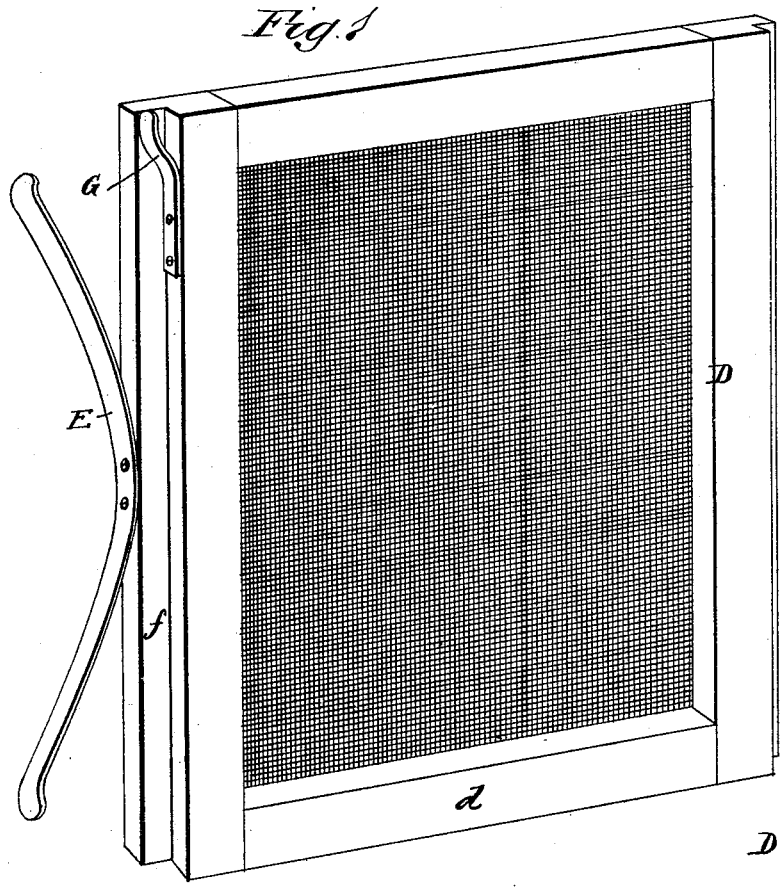
Figure 2:
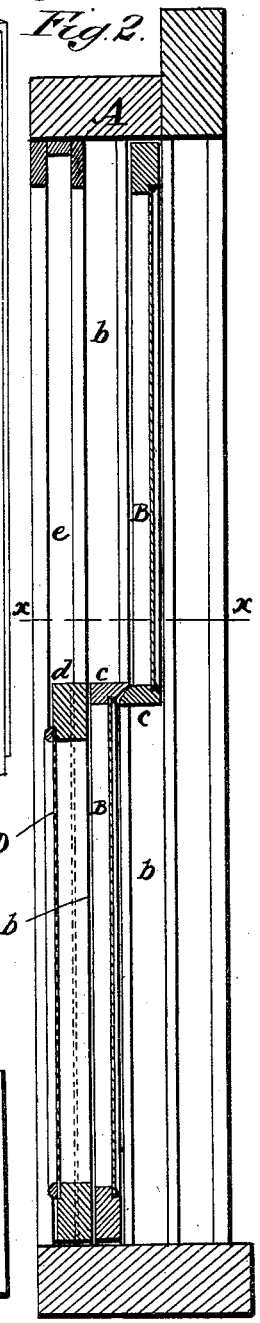
Figure 3:
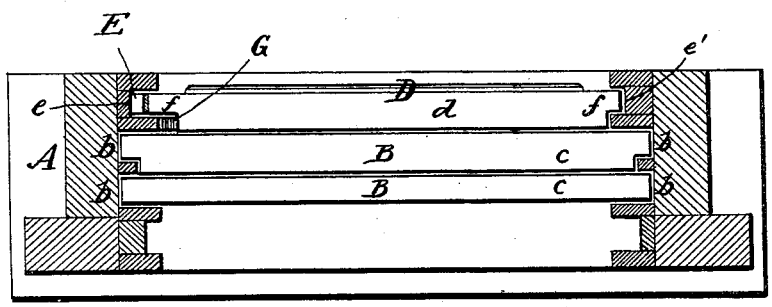

Figure 1 represents a perspective view of the improved screen detached from the window-frame; Fig. 2, a vertical section of the same as applied to a window-frame in connection with an upper and lower sash, and Fig. 3 is a transverse section upon the line $x$ $x$ in Fig. 2.

A indicates the window-frame, and B the upper and lower sashes, designed to slide up and down in grooved ways $b\ b$ therein, $c\ c$ being the meeting-rails of the sashes.

D is the screen, which may be composed of wire cloth or netting secured within a frame $d$ and which is arranged to be operated within grooved ways $e\ e'$ in the jambs or sides of the window-frame the full height of the frame, so as to take in both sashes, or rather the space formed by the opening of either sash. This frame D has a rabbet $f$ made in its opposite uprights or sides contiguous to and arranged to fit within the grooved ways $e\ e'$ and over the inner walls thereof next to the sash. The grooved ways $e\ e'$ are made of unequal depth, the one $e$ being made deeper than the other $e'$, and a semi-elliptical friction-spring E being attached to the one side upright of the frame $d$, which bears against the back wall of the deeper groove $e$ to control and support the screen and keep it in place, with freedom to move up and down and to provide for the ready insertion and removal, when required, of the screen, which is made of a suitable width for the purpose. This friction-spring E is secured to the projecting portion of the rabbet $f$, which works within the grooved way $e$, and attached to the depressed portion of the same rabbet which faces the inner side wall of the grooved way $e$ and laps over it, so as to come close up to the inner sash, is a smaller supplemental side spring or spring-guard G, closing the grooved or depressed portion of the rabbet $f$, in which said guard G projects, thus preventing flies, mosquitoes, and other insects from getting into the room through the groove formed by the rabbeted screen and entering between the meeting-rails of the sashes when open, and serving, in conjunction with the rabbeted screen lying close up to the sash, to make a more perfect tight-fitting screen.

Having thus described my invention, I claim as new and desire to secure by Letters Patent—

The sliding screen D, constructed with vertical rabbets $f$ on its opposite sides and inner face and provided with a spring-guard G on the base of the rabbet, and a friction-spring E on the outer or projecting portion of the rabbet, substantially as specified.

HENRY B. DODGE.

Witnesses:
  EDWARD R. SWETT,
  THOMAS W. SENNOTT.